United States Patent [19]
Mochel et al.

[11] Patent Number: 5,350,470
[45] Date of Patent: Sep. 27, 1994

[54] METHOD OF FORMING TIRE BEAD ASSEMBLY

[75] Inventors: Virgil D. Mochel, Wadsworth; Walter Tomaszewski, Canton; Georg G. A. Bohm, Akron, all of Ohio

[73] Assignee: Bridgestone Corporation, Tokyo, Japan

[21] Appl. No.: 159,419

[22] Filed: Nov. 30, 1993

[51] Int. Cl.⁵ .................. B29D 30/48; B60C 15/06
[52] U.S. Cl. .................. 156/136; 152/541; 156/132; 156/401; 156/421.4; 156/460
[58] Field of Search .......... 156/136, 135, 132, 134, 156/213, 304.1, 400, 401, 402, 422, 460, 421.4; 152/541, 542, 539

[56] References Cited

U.S. PATENT DOCUMENTS

| | | | |
|---|---|---|---|
| 1,536,080 | 5/1925 | Davidson | 152/541 |
| 1,562,678 | 11/1925 | Beyea | 156/136 |
| 2,045,545 | 6/1936 | Smook | 156/421.4 |
| 3,011,540 | 12/1961 | Vanzo et al. | 156/422 |
| 3,044,523 | 7/1962 | Drakeford et al. | 152/541 |
| 3,185,607 | 5/1965 | Nebout | 156/132 |
| 4,168,336 | 9/1979 | White et al. | 156/422 |
| 4,410,389 | 10/1983 | Cole et al. | 156/398 |
| 4,662,961 | 5/1987 | Philpott | 156/136 |
| 4,933,034 | 6/1990 | Kokubu et al. | 156/136 |
| 4,990,212 | 2/1991 | Pizzorno | 156/398 |
| 5,100,497 | 3/1992 | Moody et al. | 156/460 |

FOREIGN PATENT DOCUMENTS

| | | | |
|---|---|---|---|
| 22130 | 11/1961 | Japan . | |
| 57578 | 5/1979 | Japan | 156/136 |
| 180604 | 11/1985 | Japan | 152/541 |
| 1003712 | 9/1965 | United Kingdom | 152/541 |

Primary Examiner—Geoffrey L. Knable
Attorney, Agent, or Firm—David A. Thomas

[57] ABSTRACT

A method of forming a bead assembly for use in a pneumatic tire includes extruding a strip of green elastomeric material onto a split or pair of steel supporting guide ring where the ends of the extruded strip are cut at a bias angle and then spliced together to form an annular elastomeric member. The extruded strip and formed annular member has a pair of tapered longitudinal end members joined by a central recess. An annular tire bead is placed in radial alignment about the central recess of the annular member. Next, a segmented mandrel carrying inflatable turnup bladders is expanded outwardly, afterwhich the split guide ring is axially withdrawn. The mandrel and bladders then provide the support for the elastomeric member previously provided by the split annular ring, and traps the bead within the central recess. The two longitudinal end members of the extruded strip are then turned up about the bead by inflating the bladders to form the bead assembly, afterwhich the assembly is placed in a shaping mold. If desired, an annular strip of reinforcing material may be placed concentrically about the bead before the end members are turned up about the bead, to provide internal reinforcement for the bead assembly.

13 Claims, 5 Drawing Sheets

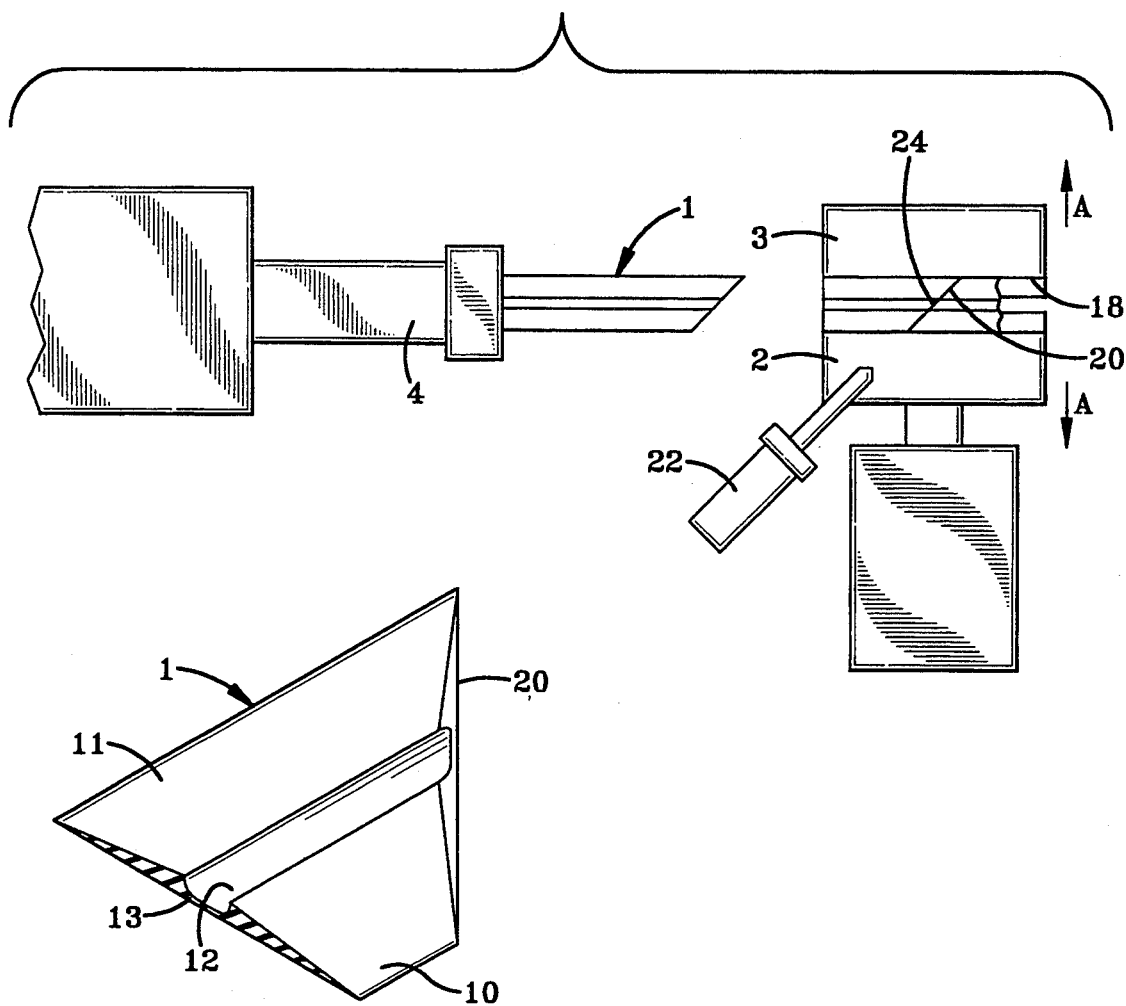
FIG-1
FIG-2
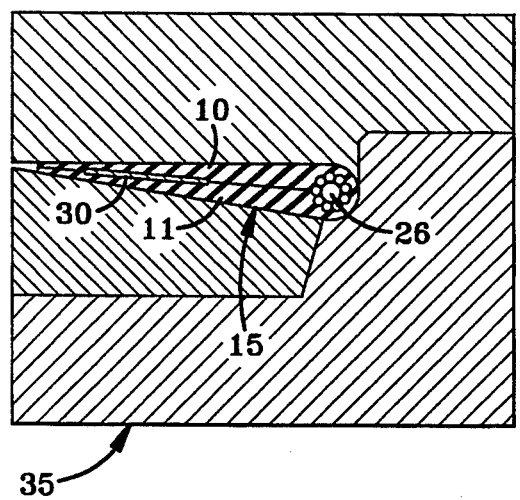
FIG-8

FIG-3
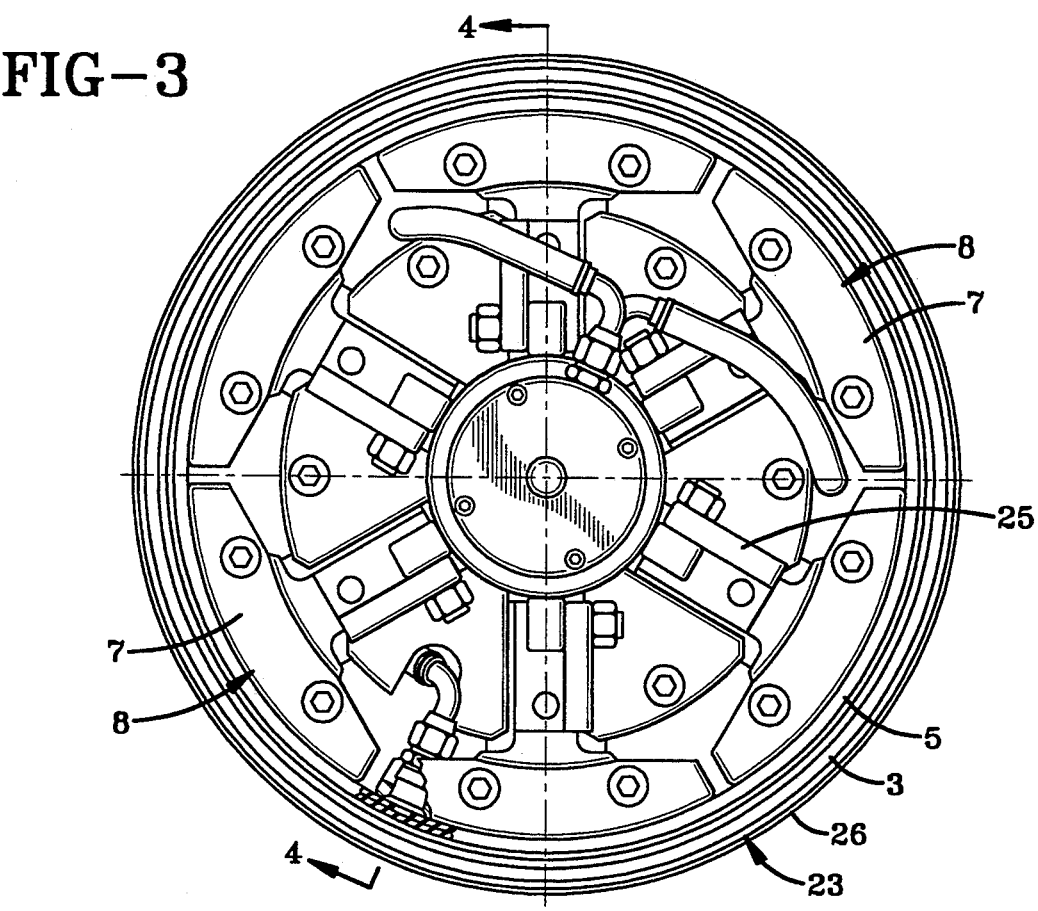
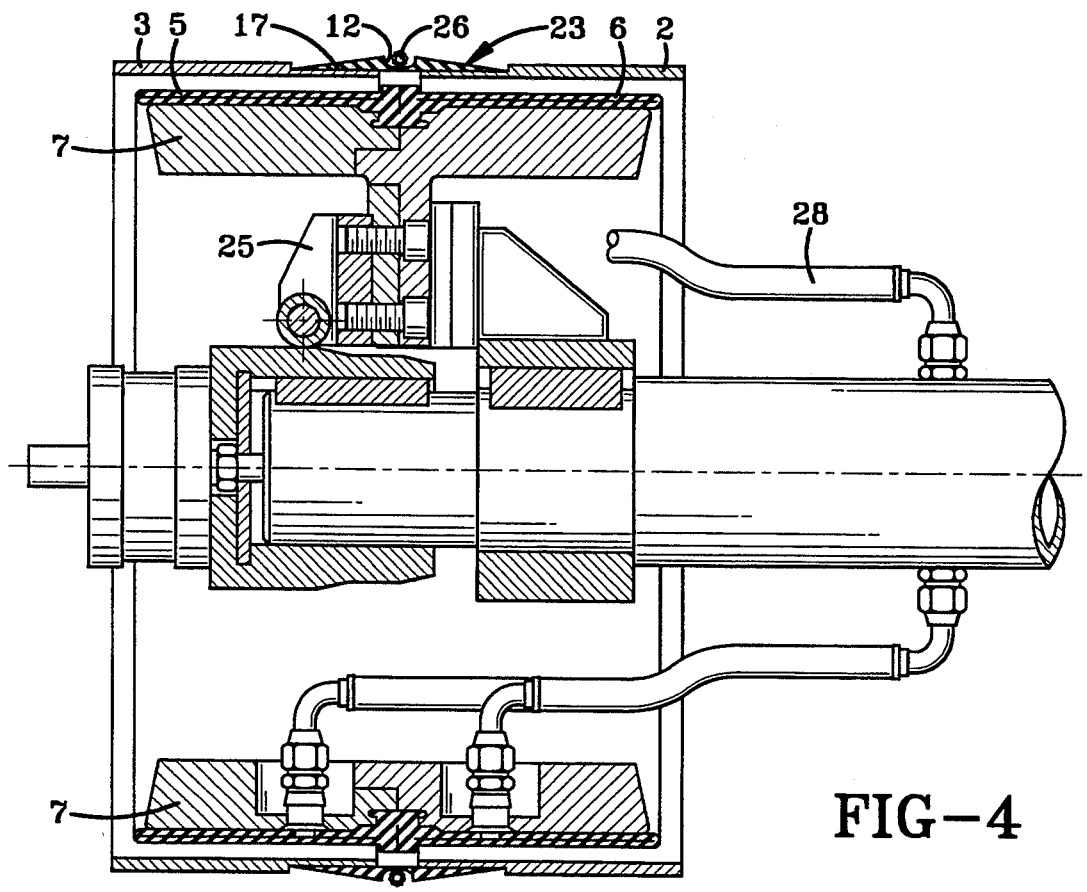
FIG-4

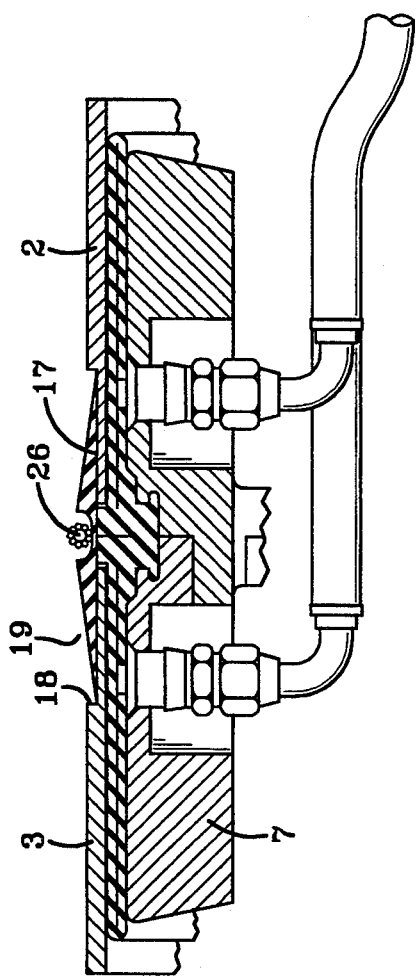
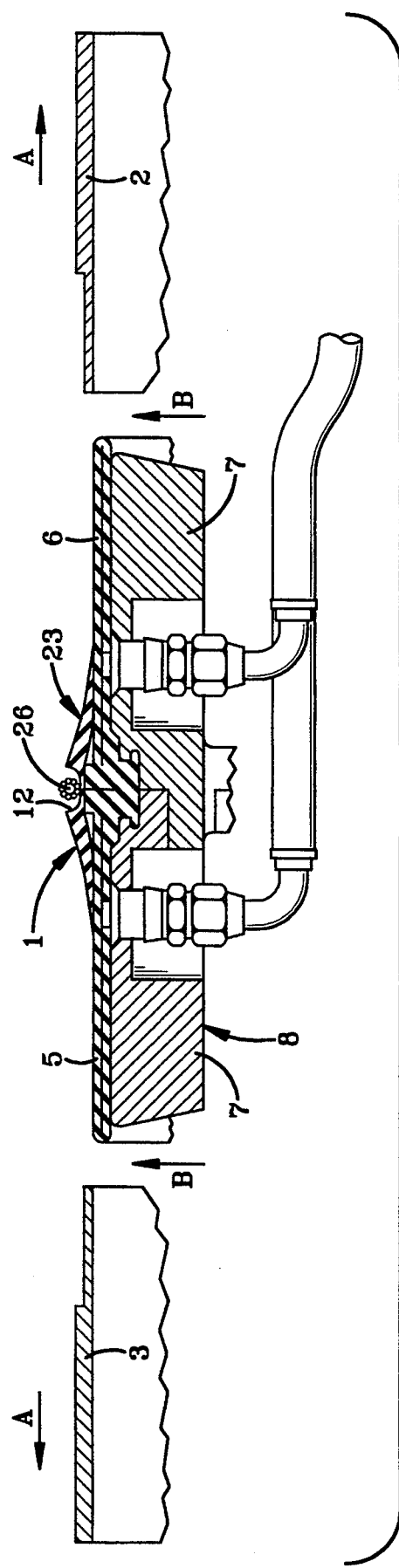
FIG-5
FIG-5A

METHOD OF FORMING TIRE BEAD ASSEMBLY

BACKGROUND OF THE INVENTION

1. Technical Field

The present invention relates to the manufacture of bead assemblies of the type incorporated into a pneumatic tire. More particularly, the invention relates to a method of manufacturing which enables bead assemblies to be produced automatically with minimum distortion to the green or uncured elastomeric material which forms the bead filler thereby providing a bead with good dimensional uniformity throughout the entire bead assembly, thereby reducing nonuniformity in the final tire into which it is subsequently incorporated.

2. Background Information

One of the components of a pneumatic tire is the bead assembly which consists of an annular bead, usually formed of a wound metal band or cable, which is combined with an elastomeric bead filler usually having a generally triangular configuration. The bead assembly then is formed as part of the final tire and used for maintaining the inflated tire on its mounting rim. It is desirable when producing the bead assembly that it be as free as possible of nonuniform areas and any out of roundness or unwanted projections or depressions, all of which add to the nonuniformity of the final tire in which it is incorporated. Furthermore, it is desirable that the bead assemblies be produced as efficiently and inexpensively as possible in order to decrease the cost of the final tire.

Many known methods for producing tire bead assemblies extrude the bead filler with its final triangular shape, afterwhich it is placed on the bead and secured thereto subsequent to curing. However, during these manufacturing methods it is difficult to handle the uncured green elastomeric bead filler due to its extreme flexibility, without distorting the bead filler. Even minor distortions can cause undesirable nonuniformity in the final tire.

Examples of prior art methods and apparatus for forming tire bead assemblies are shown in the following patents.

U.S. Pat. No. 1,536,080 discloses a very early method of forming a tire bead in which a fabric is coated with a slow curing rubber and encloses a core ring and a filler of faster curing rubber, afterwhich the bead core is semi-cured to a degree which partially vulcanizes the filler and leaves the external coating soft and tacky whereupon the bead core can be incorporated into a tire casing.

U.S. Pat. No. 4,410,389 shows a bead filler assembly apparatus wherein the filler is extruded in a triangular configuration and is placed and attached to the bead.

U.S. Pat. No. 4,662,961 discloses a method of forming a bead assembly in which an elastomeric strip is extruded in order to impart a substantially circular cross-sectional configuration thereto with a square cross-sectional channel formed therein. An adhesive is then applied, afterwhich a wire is wound around the support until the channel is filled to form the final bead assembly.

U.S. Pat. No. 4,933,034 discloses another method of forming a bead assembly in which the bead filler is formed by an extruder and fed onto the bead ring and wound thereabout, and then subsequently bonded to the outer periphery of the bead.

U.S. Pat. No. 4,990,212 discloses a method of forming a bead assembly in which a triangular shaped bead filler is formed and is then wound about the bead ring.

U.S. Pat. No. 5,100,497 discloses another method and apparatus for forming a bead assembly in which the bead filler or apex is extruded in a generally triangular configuration and then wound about the bead ring by a plurality of rollers.

Japanese Patent Application 36-22130 shows a device for assembling metal fabric onto a bead wire without exerting an adverse effect on the strength of the fabric ply. A tubular elastic film is wound around the periphery of the cylinder which can be outwardly expanded. A pair of bell-shaped hoods are mounted around the cylinder containing the elastically flexible film and bead wire whereby the conical portions of the hoods control the expansion of the film when the mounting cylinder is expanded.

Japanese Patent Application 54-57578 and Japanese Utility Model 60-180604 are believed to be the most pertinent prior art with respect to the method of the present invention. Both of these disclosures show the extrusion of a strip of elastomeric material having a pair of wing-like end members which are subsequently folded about a rectangular-shaped bead in order to produce the final bead assembly. However, neither of these prior art Japanese methods are believed to eliminate or materially reduce the unwanted distortions which occur in a green unvulcanized strip of rubber, which is achieved in the present invention disclosed herein. Neither of these methods disclose continuously supporting the unvulcanized green elastomeric material until it has been formed into the final bead assembly, nor do they disclose the incorporation of a reinforcement strip in the bead filler by placement of the strip between the two wing-like end members of the elastomeric strip prior to closure about the bead, nor do they disclose the joined ends of the bead filler strip having a bias angle cut, and the formation of the subsequent splice being performed on a rigid support to further reduce the introduction of unwanted stresses on the uncured elastomeric material as in the method of the present invention.

Therefore, the need exists for an improved method of forming a tire bead assembly which produces a bead assembly with good dimensional uniformity by providing good splice integrity and by providing continuous support for the uncured green elastomeric material which forms the bead filler portion of the bead assembly until it is vulcanized.

SUMMARY OF THE INVENTION

Objectives of the invention includes providing an improved method of forming a tire bead assembly in which the bead filler is extruded in a continuous length and then cut at a bias angle on a rigid support to form an annular elastomeric member having a stable and balanced splice, which member is then subsequently wrapped around the bead to provide a uniform and stable bead assembly.

A further objective of the invention is to provide such a method in which the bead filler strip may be extruded of one or more different compounds to achieve different bead assembly characteristics; and in which the bead assembly can be formed whereby the bead filler or apex extends radially outwardly from the bead or can be formed so as to extend at an outwardly extending angle which is desirable for certain tire applications.

Another objective of the invention is to provide such a method in which the elongated extruded strip and subsequent annular spliced member formed thereby, is maintained supported on a rigid support member until formed about a bead to reduce undesirable distortions in the highly flexible unvulcanized green elastomeric material.

Still another objective of the invention is to provide such a method in which a strip of reinforcing material may be wrapped about the bead or mounted coaxial therewith for subsequent incorporation into the bead filler to strengthen the bead assembly for certain tire applications.

A still further objective of the invention is to provide such an improved method in which longitudinal end members of the elastomeric strip are turned up about the bead to form the bead assembly by known types of inflatable turnup bladders, individually or in combination with axial push plates, in order to completely close the bead filler about the bead to avoid the formation of air bubbles within the bead filler.

Another objective of the invention is to provide such an improved method in which a stock containing promoters for adhesion to the metal bead can be coextruded in a central recessed area of the extruded strip, which recessed area will contact the bare metal wire of the bead, while the remainder of the bead filler can consist of one or more stocks having different properties.

Still another objective of the invention is to provide such an improved method in which the bead is incorporated easily within the interior of the bead filler by positioning the annular bead over the bead filler strip prior to the filler being turned up and entrapping the bead firmly therein.

A further objective of the invention is to provide such a method in which the uncured extremely flexible extruded strip of elastomeric material is applied onto a solid metal structure which assures accuracy of assembling and subsequent cutting and splicing of the strip while so supported, prior to the bead being locked into position through the expansion of segmented expandable mandrels.

Still another objective of the invention is to provide such a method which eliminates difficulties encountered with prior methods and apparatus for forming tire beads in an effective, efficient and inexpensive manner, and most importantly which produces a bead assembly with reduced nonuniformities therein.

These objectives and advantages are obtained by the improved method of the invention, the general nature of which may be stated as including a method of forming a bead assembly which comprises a bead filler and an annular bead which includes the steps of extruding an elongated strip of elastomeric material having a pair of longitudinal end members and an intervening recess; winding a predetermined length of said strip about a rigid annular supporting structure; splicing cut ends of the strip together to form a joined annular elastomeric member; placing an annular bead about the annular elastomeric member in radial alignment with the recess; locking the bead within the recess by expansion of a segmented expandable mandrel; withdrawing the rigid annular supporting structure from within the joined annular elastomeric member; and turning the two longitudinal end members around the bead and into contact with each other to form an annular bead assembly.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

FIG. 1 is a diagrammatic plan view showing the initial steps of the present invention of extruding the elongated strip and performing the bias bevelled cut thereon while supported on the rigid support members;

FIG. 2 is an enlarged fragmentary sectional view showing the cross-sectional configuration of the extruded strip and the bias cut angle at one end thereof;

FIG. 3 is an end elevational view of the expandable segmented mandrel having the steel support guide rings located concentrically thereabout supporting the bead filler strip and bead with the segments in retracted position;

FIG. 4 is a sectional view taken on line 4—4, FIG. 3;

FIG. 5 is an enlarged fragmentary sectional view of a portion of FIG. 4;

FIG. 5A is a sectional view similar to FIG. 5 showing the retraction of the steel guide support rings and position of the mandrel in the expanded bead supporting position;

FIG. 8 is a fragmentary sectional view showing the bead produced by the method steps of FIGS. 1–7 placed in a curing mold;

Similar numerals refer to similar parts throughout the drawings.

DESCRIPTION OF THE PREFERRED EMBODIMENT

Figure 6:
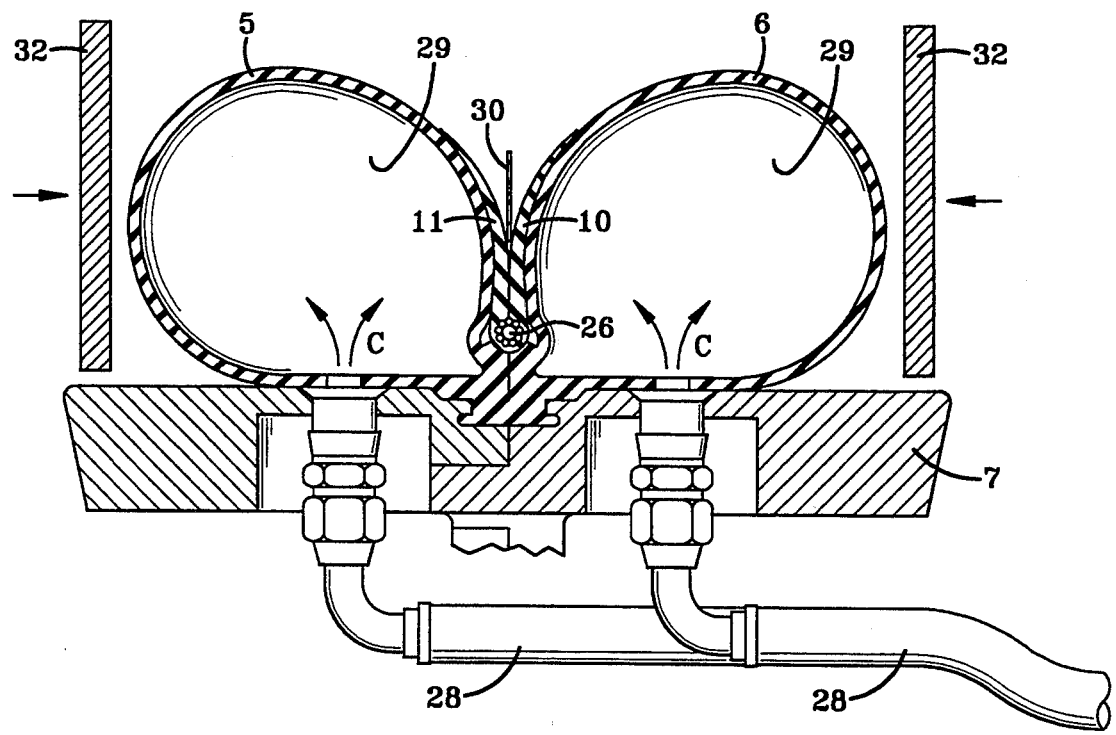
FIG. 6 is a fragmentary sectional view generally similar to FIG. 5A, with the turnup bladders in a partially inflated position to start the wrapping of the bead filler around the bead, and with a reinforcing strip being shown incorporated therein.

FIG. 1 shows the initial several steps of the improved method in which a strip of uncured green elastomeric material indicated generally at 1, is extruded from a usual extruder 4 in a continuous strip. Strip 1 is fed onto the surface of a pair of steel supporting guide rings 2 and 3 which are adapted to extend coaxially about and in a concentric spaced relationship with a pair of annular inflatable turnup bladders 5 and 6 (FIGS. 3–7) which are mounted about the segments 7 of an expandable mandrel, which is indicated generally at 8 and best shown in FIGS. 3 and 4.

FIG. 2 shows the cross-sectional configuration of extruded strip 1 which includes a pair of longitudinally extending wing-like end members 10 and 11, which have an outwardly tapered configuration and which terminate in a central concave recess 12. End members 10 and 11, as well as material strip 13 which forms the bottom of recess 12, may be formed of the same elastomeric material or compound, or all three components could be formed of different elastomeric compounds if desired, to achieve different characteristics for the final bead assembly, which bead assembly is indicated at 15, and shown particularly in FIG. 8.

In accordance with one of the features of the invention, best shown in FIGS. 3–7, guide rings 2 and 3 which are cylindrical metal members, are formed with stepped end areas 17 that terminate in annular shoulders 18. Rings 2 and 3 are axially movable toward and away from each other (arrows A, FIG. 1) by usual transfer mechanisms (not shown), and assume the position of FIG. 5 for receiving and entrapping a predetermined length of strip 1 within areas 17.

Strip 1 is extruded into an annular recessed area 19 formed by adjacent stepped areas 17 and shoulders 18 of rings 2 and 3, as shown in FIG. 1, and while so supported within this recessed area on rigid guide rings 2 and 3, has its trailing edge cut at a bias angle as shown by 20, in FIGS. 1 and 2 by a cutter 22. Cutter 22 can be a blade type cutter, ultrasonic cutter or the like, without affecting the concept of the invention. The two bias cut edges 20 are then spliced together at 24 to form a joined annular elastomeric member 23 as shown in FIG. 1. Splice 24 may be a butt joint, an overlap bevel joint, or other type of joint without affecting the invention. However in accordance with one of the main features of the invention, strip 1 is supported on the stepped end areas of support rings 2 and 3 during the cutting and splicing operation, thereby preventing distortion to the extremely flexible uncured green elastomeric material of strip 1, ensuring that subsequent annular member 23 is relatively free of distortions as can occur in the prior art methods of forming tire bead assemblies.

After forming splice 24, mandrel segments 7 are expanded outwardly into the position shown in FIG. 5, wherein bladders 5 and 6 are located immediately adjacent annular elastomeric member 23. Next, support rings 2 and 3 are axially withdrawn away from each other, as shown by Arrows A in FIGS. 1 and 5A, whereupon elastomeric member 23 is then supported by bladders 5 and 6, as shown in FIG. 5A. Movement of segments 7 is accomplished by various well-known linkage mechanisms 25 and the associated control actuating system therefor. Prior to the outward expansion of mandrel segments 7, a bead 26 is radially aligned above strip recess 12 as shown in FIG. 4. Bead 26 preferably is moved automatically into position above recess 12 by a bead transfer mechanism well known in the art, such as shown in U.S. Pat. No. 4,830,693 and in pending U.S. patent application Ser. No. 08/075,194, filed Jun. 10, 1993.

The outward expansion of mandrel segments 7 in the direction of arrows B (FIG. 5A) which carries with it inflation bladders 5 and 6, will immediately support annular elastomeric member 23 thereon as shown in FIG. 5A upon the withdrawal of support rings 2 and 3, again preventing distortion of flexible member 23, while positioning bead 26 within recess 12.

Figure 7:
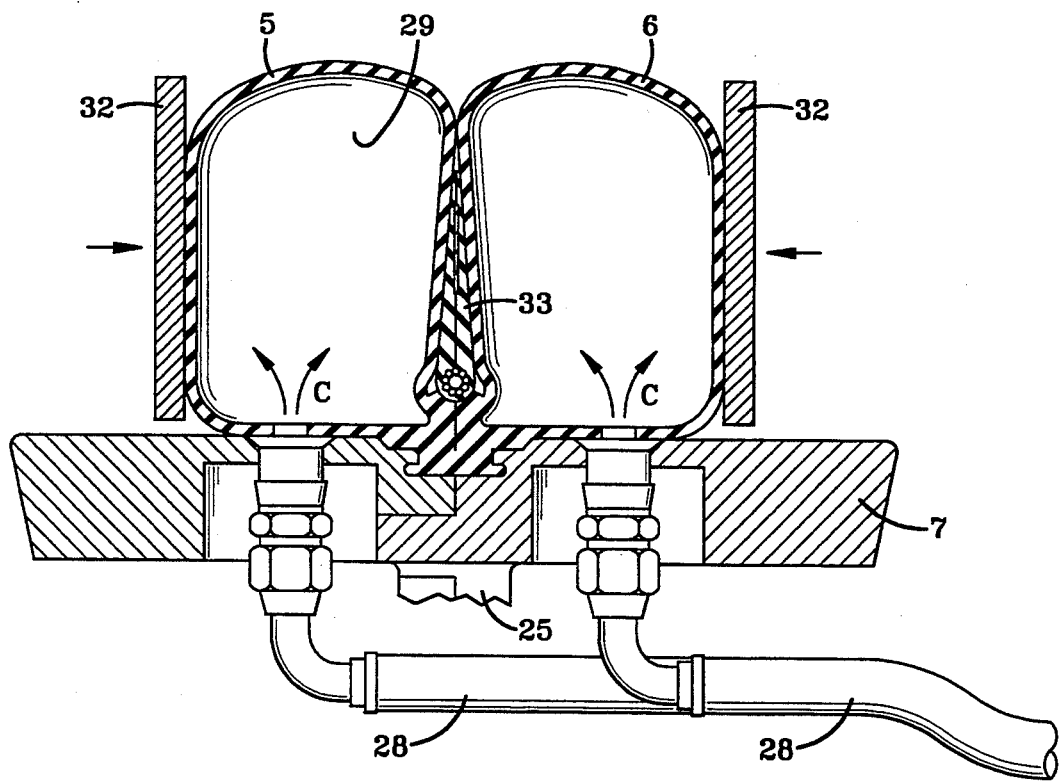
FIG. 7 is a view similar to FIG. 6 with the turnup bladders in fully inflated position and side compression plates in engagement therewith.

The next steps of the improved process is shown in FIGS. 6 and 7. An inflation pressurizing fluid indicated by arrows C, is fed through fluid supply lines 28 into interiors 29 of bladders 5 and 6, to inflate the bladders, which in turn, move longitudinal ends 10 and 11 of annular member 23 upwardly around bead 26 to enclose it within recess 12.

If desired, an annular band of reinforcing material 30 may have been previously placed coaxially above or in contact with bead 26, when annular member 23 and bead 26 are in the position as shown in FIG. 5, to provide internal reinforcing to the final bead filler when completed. Reinforcement 30 may be fabric, metal mesh or similar materials.

Referring to FIG. 7, in certain applications after bladders 5 and 6 are fully inflated, another pair of inflation bladders referred to as "push over∞ bladders (not shown), or push plates 32 may be used in order to enable sufficient pressure to be exerted by bladders 5 and 6 against end members 10 and 11 of elastomeric member 23, to press the two end members together with sufficient force to completely eliminate the formation of any voids or air bubbles therebetween and in the vicinity around bead 26, to provide a generally uniform bead filler or apex 33. Next, the green bead assembly which consists of bead 26 and bead apex or bead filler 33, and in certain applications reinforcement 30, may be placed in a mold or shaping press indicated generally at 35 (FIG. 8), where the bead assembly 15 can be cold pressed into its final shape, and if desired can be partially cured for subsequent handling and incorporation into a tire in a usual tire building process.

Figure 9:
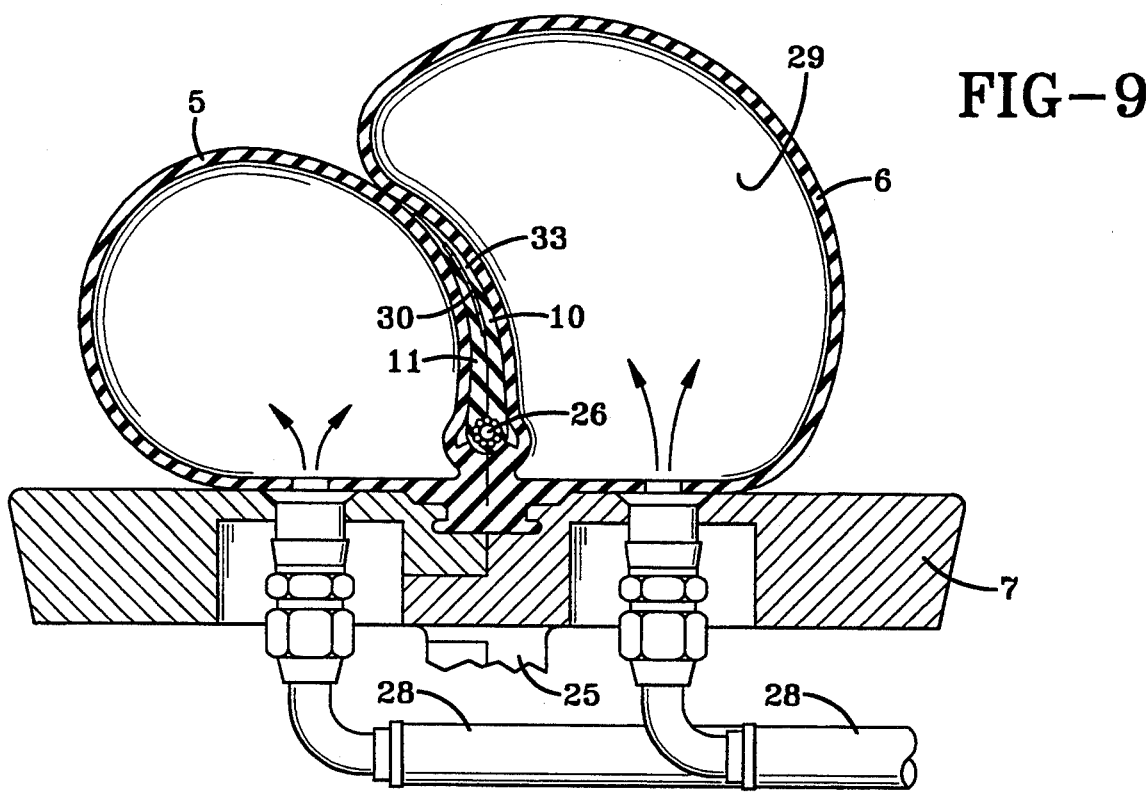
FIG. 9 is a fragmentary sectional view similar to FIG. 7 showing the unequal inflation of the two turnup bladders in order to form a bead assembly having a curved bead filler.

FIG. 9 shows a modification to the present invention in that bladder 5 is inflated at a greater rate and with greater pressure than that of bladder 6, in order to form bead filler 33 with a curved configuration, in contrast to the radial position of the bead filler as shown in FIGS. 7 and 8. Such angled bead fillers in a bead assembly are desirable for certain tire applications, and can be achieved by the method of the present invention simply and effectively, by merely changing the amount and pressure of the inflation fluid placed in the respective turnup bladders.

It is readily understood that other types of turnup means could be utilized instead of bladders 5 and 6, although the use of such bladders is well known for turnup applications in the tire building industry, and are readily available and have proven successful, and thus is the preferred turnup means of the present invention. Furthermore, it is readily understood that the cross-sectional configuration of extruded strip 1 can vary from that shown in FIG. 2 without affecting the concept of the invention.

Figure 10:
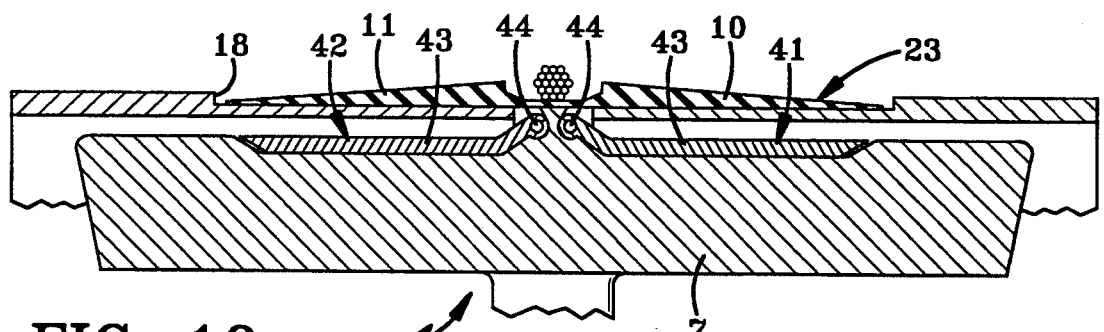
FIG. 10 is a diagrammatic view of a modified bead turnup mechanism.
Figure 11:
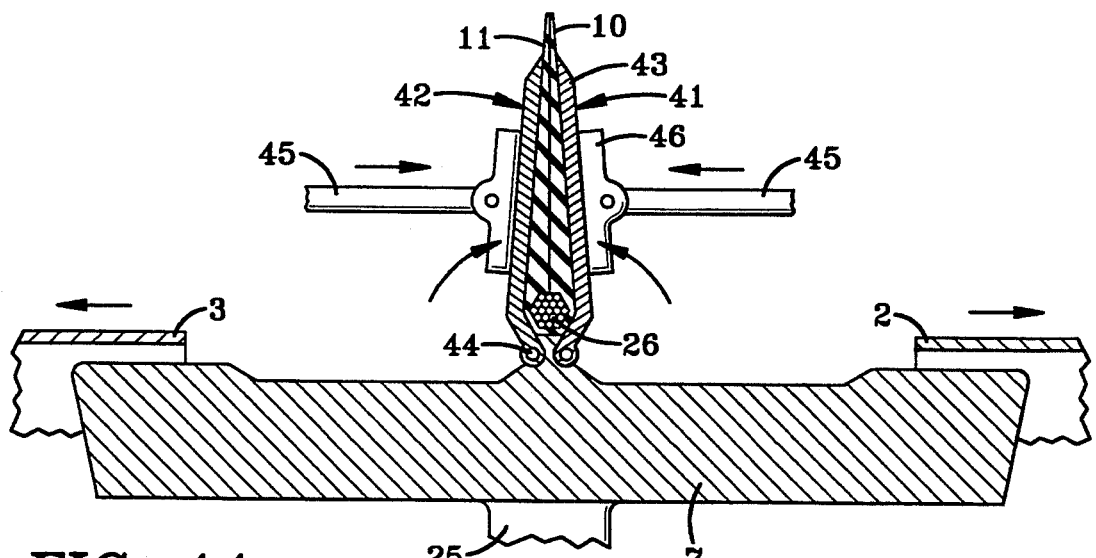
FIG. 11 is a diagrammatic view of the bead turnup mechanism of FIG. 10 shown in the turned-up position compressing the bead filler strip about the bead.

A modified bead turnup mechanism is shown in FIGS. 10 and 11, and is indicated generally at 40. Mechanism 40 includes a pair of rings indicated generally at 41 and 42, which are formed by a plurality of segmented plates 43 which are pivotally mounted at 44 to mandrel segments 7. Rings 41 and 42 replace turnup bladders 5 and 6 and will be moved into position immediately adjacent annular elastomeric member 23, as shown in FIG. 10, upon the outward expansion of mandrel segments 7.

Upon the retraction of rings 2 and 3, as shown in FIG. 11, plates 43 will be pivoted upwardly by an actuating mechanism (not shown) carrying with them wing members 10 and 11 of elastomeric members 23 to the position of FIG. 11, wherein annular member 23 wraps around bead 26.

Next, some type of mechanism, such as a plurality of rods 45 having pressure plates 46 pivotally mounted at the ends thereof, are actuated by a pressure mechanism, such as a hydraulic or pneumatic cylinder, turnscrew, or the like, for applying sufficient pressure against plate segments 43 to cold press wing members 10 and 11 into their final configuration before curing, in a somewhat similar manner as does mold 35, as shown in FIG. 8. The particular mechanism for pivotally moving plate segments 43 upwardly to turn wing members 10 and 11 about bead 26, and the mechanism for applying pressure against plate segments 43 when in the closed position of FIG. 11, can take various forms without affecting the results achieved thereby.

The particular mechanism shown in FIGS. 10 and 11 and described above enables greater pressure to be applied to the closed wing segments of member 23 than may be possible with the inflated turnup bladders, individually or even if combined with push plates 32. This can eliminate the use of a subsequent cold pressing operation as performed by mold 35, as shown in FIG. 8.

In summary, the improved method of the present invention provides for the formation of a relatively uniform bead assembly free of unwanted distortion in the bead filler or apex material thereof, by maintaining the highly flexible uncured green material in a supported condition generally throughout the process until the final bead assembly is cured; and in which the improved method provides a rigid support for the uncured bead filler during the formation of the splice, which splice is formed on a bias angle so that the splice extends angularly over a length of the bead assembly rather then in a single radial area, which occurs when a straight splice is provided. Likewise, the improved method enables the assembly steps discussed above to be nearly fully automated. Also, a single extruder 4 can be used to service one or a plurality of the bead building drums, enabling the bead assemblies to be mass produced with a minimum amount of equipment expenditure.

Accordingly, the improved method for forming a tire bead assembly is simplified, provides an effective, safe, inexpensive, and efficient method which achieves all the enumerated objectives, provides for eliminating difficulties encountered with prior methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved method is carried out and used, the characteristics of the construction, and the advantageous, new and useful results obtained; the new and useful method steps are set forth in the appended claims.

We claim:

1. A method of forming a bead assembly comprising a bead filler and an annular bead, including the steps of:
    extruding an elongated strip of elastomeric material having a pair of longitudinal end members and an intervening recess;
    winding a predetermined length of said strip about a rigid annular supporting structure;
    splicing cut ends of the strip together to form a joined annular elastomeric member;
    placing an annular bead about the annular elastomeric member in radial alignment with the recess;
    locking the bead within the recess by expansion of a segmented expandable mandrel;
    withdrawing the rigid annular supporting structure from within the joined annular elastomeric member; and
    turning the two longitudinal end members around the bead and into contact with each other to form an annular bead assembly.

2. The method defined in claim 1 including the step of placing an annular reinforcement member concentrically about the bead prior to the step of turning the two end members about the bead.

3. The method defined in claim 1 wherein the step of turning the end members about the bead includes inflating a pair of turnup bladders, each of which engages and turns up a respective one of the end members towards each other.

4. The method defined in claim 3 includes the step of applying a generally axial force against the pair of turnup bladders to force the bladders tightly against the end members of the annular elastomeric member.

5. The method defined in claim 4 in which the step of applying the axial force against the turnup bladders includes moving push plates axially against said bladders.

6. The method defined in claim 3 including inflating the two turnup bladders at different rates to form a curved bead assembly.

7. The method defined in claim 1 including the step of extruding the two end members of two different elastomeric materials.

8. The method defined in claim 1 including the steps of forming the annular supporting structure of two separate rings; and moving the rings axially away from each other to remove said supporting structure from within the annular elastomeric member.

9. The method defined in claim 8 including the steps of providing adjacent ends of the two rings with annular stepped areas terminating in annular shoulders; and trapping the annular elastomeric member in said stepped areas between the shoulders after the strip is wound about the supporting structure.

10. The method defined in claim 1 including the steps of placing the annular bead assembly in a press; and then final shaping said bead assembly.

11. The method defined in claim 1 including the step of cutting opposed ends of said strip at a bias angle with respect to a longitudinal axis of said strip as the strip is supported on the supporting structure.

12. The method defined in claim 1 wherein the step of turning the end members about the bead includes pivotally moving a plurality of rigid segments towards each other and trapping the end members therebetween in contact with each other.

13. The method defined in claim 12 including the step of applying a force against the rigid segments to cold press the end members therebetween into a final shape before curing.

* * * * *